(12) United States Patent
Beattie

(10) Patent No.: US 10,081,946 B2
(45) Date of Patent: Sep. 25, 2018

(54) INVERTED ROOFING SYSTEM AND METHOD

(71) Applicant: Industrial Waterproof Systems Ltd., Calgary (CA)

(72) Inventor: Craig Kenneth Beattie, Calgary (CA)

(73) Assignee: Industrial Waterproof Systems Ltd., Calgary, Alberta (CA)

( * ) Notice: Subject to any disclaimer, the term of this patent is extended or adjusted under 35 U.S.C. 154(b) by 0 days.

(21) Appl. No.: 15/348,726

(22) Filed: Nov. 10, 2016

(65) Prior Publication Data
US 2017/0138053 A1 May 18, 2017

Related U.S. Application Data

(60) Provisional application No. 62/254,604, filed on Nov. 12, 2015.

(51) Int. Cl.
*E04D 11/02* (2006.01)
*E04D 11/00* (2006.01)

(52) U.S. Cl.
CPC ............ *E04D 11/02* (2013.01); *E04D 11/002* (2013.01); *Y02A 30/254* (2018.01); *Y02B 80/32* (2013.01)

(58) Field of Classification Search
CPC ..... E04D 11/002; E04D 11/02; Y03A 30/254; Y02B 80/32
See application file for complete search history.

(56) References Cited

U.S. PATENT DOCUMENTS

| | | | |
|---|---|---|---|
| 3,597,297 A * | 8/1971 | Buchholtz et al. | C08J 9/00 156/72 |
| 3,801,421 A * | 4/1974 | Allen | C08G 18/79 156/242 |
| 4,337,283 A * | 6/1982 | Haas, Jr. | E01C 13/08 428/17 |
| 4,341,836 A * | 7/1982 | Becker | E01C 7/30 273/DIG. 13 |
| 4,389,435 A * | 6/1983 | Haas, Jr. | B32B 5/24 428/17 |
| 4,719,723 A * | 1/1988 | Van Wagoner | E04D 11/02 52/15 |

(Continued)

FOREIGN PATENT DOCUMENTS

| EP | 2385183 A1 * | 11/2011 | ........... E04D 11/002 |
|---|---|---|---|
| JP | 85027761 B * | 7/1985 | |

(Continued)

OTHER PUBLICATIONS

Machine_Translate_WO_2014189140 (http://translationportal.epo.org/emtp/translate/?ACTION=description-retrieval&COUNTRY=WO&ENGINE=google&FORMAT=docdb&KIND=A1&LOCALE=en_EP&NUMBER=2014189140&OPS=ops.epo.org/3.2&SRCLANG=ja&TRGLANG=en).*

*Primary Examiner* — Babajide A Demuren
(74) *Attorney, Agent, or Firm* — Knobbe Martens Olson & Bear LLP

(57) ABSTRACT

The present invention provides an inverted roofing system and method that is more thermally efficient, inexpensive and quicker to install, better able to withstand environmental conditions, and produces the appearance and some functional benefits of a traditional natural green roof ballast top-layer. It does not require a sloped roof gradient, and is capable of a user controlled mass per square foot roof load. The inverted roofing system and method provides a ballast top-layer that is lightweight, and maintains properties that will prevent wind uplift.

6 Claims, 1 Drawing Sheet

(56) References Cited

U.S. PATENT DOCUMENTS

| | | | | |
|---|---|---|---|---|
| 6,338,885 | B1* | 1/2002 | Prevost | E01C 13/08 428/17 |
| 6,472,041 | B1* | 10/2002 | Burke | B32B 5/08 428/17 |
| 6,527,889 | B1* | 3/2003 | Paschal | E01C 13/08 156/279 |
| 6,800,339 | B2* | 10/2004 | Motz | E01C 13/08 405/36 |
| 8,221,856 | B2* | 7/2012 | Stroppiana | A47G 27/0468 428/17 |
| 8,863,442 | B2* | 10/2014 | Freeman | E04D 5/145 52/23 |
| 2009/0133339 | A1* | 5/2009 | Carolan | E04B 7/22 52/173.1 |
| 2011/0113702 | A1* | 5/2011 | Hasan | E04D 11/002 52/173.1 |
| 2012/0258811 | A1* | 10/2012 | Tetrault | E01C 13/08 472/92 |
| 2013/0177718 | A1* | 7/2013 | Packer | D06M 11/45 428/17 |
| 2014/0322459 | A1* | 10/2014 | Tetrault | E01C 13/08 428/17 |
| 2016/0096976 | A1* | 4/2016 | Yoshino | C08K 5/0016 524/873 |

FOREIGN PATENT DOCUMENTS

| | | | | |
|---|---|---|---|---|
| JP | 2006022609 A | * | 1/2006 | |
| JP | WO 2014189140 A1 | * | 11/2014 | C08K 5/0016 |
| KR | 100777142 B1 | * | 11/2007 | |

* cited by examiner

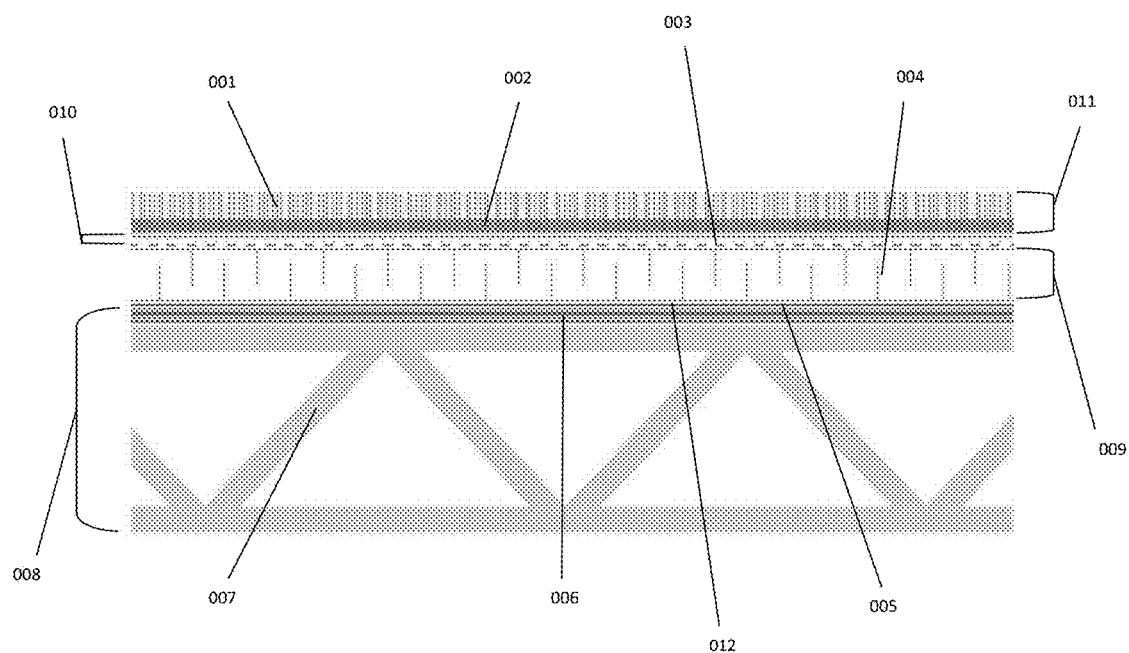

INVERTED ROOFING SYSTEM AND METHOD

CROSS-REFERENCES TO RELATED APPLICATIONS

This application claims the benefit of priority to U.S. Provisional Patent Application No. 62/254,604, filed on Nov. 12, 2015, the disclosure of which is hereby expressly incorporated by reference in its entirety.

FIELD OF THE INVENTION

The present invention pertains to the field of roofing design. In particular inverted roofing system and method design.

BACKGROUND

The construction of inverted roofing systems is well known within the construction industry and has been practiced for several years. Inverted roofing systems provide for a quick, easy and efficient installation reducing cost in comparison to traditional built-up roofs. They also reduce the number of water impermeable membrane seams present on the roof, which lowers the probability that the roof will leak. Roof repairs and maintenance are made easier, and the lifetime of the roof is improved.

The industry standard inverted roofing systems typically comprise a roof deck, a water impermeable layer, a thermal insulating layer, a filtration layer, and a ballast top-layer. This composite roof structure can be manipulated and altered in a variety of ways in order to adjust the particular characteristics of the roof. For example, the ballast layer on the top of the system can be made of gravel, stone pavers, or even green material (such as grass/sod) in order to alter the functionality or appearance of the roof.

Although inverted roofing systems have provided for improvements in roofing construction, there remain some issues. Load associated with the inverted roof, and in particular the ballasting can force architects and designers to reinforce building structures to accommodate this load. Such design can increase building costs, time of construction and may limit design capabilities. The cost and time required for the installation of an inverted roofing system is also significant. The inverted roofing system layers can be worn down and degraded by environmental factors such as UV rays, moisture, and temperature. Green roofs, which utilize organic matter ballast, may also retain water mass in plant material/soil. This may further increase the load of the inverted roofing system that must be supported by the building structure.

Inverted roofing systems are manufactured such that most of the components of the roof are not fastened directly to the roof deck. By eliminating nearly all adhesives and fasteners the cost and time of roof installation are reduced. However there are concerns about wind uplift on the roof—the ability of strong wind to dislodge components or the entirety of the inverted roof. In order to combat these concerns, ballast layers have added mass which increased the structural strain on the building.

In some configurations, to create an effective inverted roofing system, the roof deck requires a slope of at least a 2% gradient. This necessity creates design obligations, high costs, and reduces the available uses for a roof structure.

In other configurations, to create an effective inverted roofing system the roof deck can be flat, but in these configurations the ballast top-layer requires a mass load of at least 10 pounds per square foot (lbs/sq ft). This necessity creates design obligations, high costs, and reduces the available uses for a roof structure.

Green roofing ballasts require maintenance and additional infrastructure. Such systems need water and nutrient to grow and thrive which must be provided through ongoing care or functioning infrastructure. These additional elements can be costly and may further increase the overall roof load that the building structure must then support.

Artificial green roofing ballasts, such as Astroturf, have been introduced in an attempt to reduce the additional resources associated with traditional green roofing ballast. Although such synthetic replacements may somewhat reduce the maintenance and infrastructure requirement, other green roofing benefits associated with the natural appearance of a traditional organic green roofing are reduced.

One product of recent developments within construction industry is the improvement of roofing costs. However loss of heat (or alternatively retention of heat), material, labor, and replacement costs drive up the overall costs of construction and in particular the costs of constructing a roof. Further specialized roofs such as traditional green roofs make for even greater associated costs.

Therefore there is a need for an inverted roofing system that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF INVENTION

An object of the present invention is to provide an inverted roofing system. In accordance with an aspect of the present invention, there is provided an inverted roofing system for a roof deck comprising a water impermeable layer supported by said roof deck, an insulation layer supported by said water impermeable layer, a diffusion layer supported by said insulation layer, and a ballast top-layer supported by said diffusion layer.

In accordance with another aspect of the present invention, there is provided a method of assembling an inverted roofing system comprising the steps of applying at least one water impermeable layer to at least one roof deck, applying at least one insulation layer to the at least one water impermeable layer, applying at least one diffusion layer to the at least one insulation layer, and applying at least one ballast top-layer to the at least one diffusion layer.

BRIEF DESCRIPTION OF THE FIGURES

Embodiments of the present invention will be better understood in connection with the following FIGURE, in which:

FIG. 1 illustrates a cross-sectional view of one embodiment of the inverted roofing system.

DETAILED DESCRIPTION

Definitions

The term "inverted roofing system", is used as is commonly understood within the roof construction industry, to describe a layered roof system typically comprising, a water impermeable layer, upon which a thermal insulating layer is applied, upon which a diffusion layer is applied, upon which a ballast top-layer is applied.

The term "ballast top-layer", hereinafter also referred to as the "BTL" is used to define the top layer of the inverted roofing system that secures the other inverted roofing components to the roof deck.

The term "wind uplift" is used to describe the process whereby environmental damage is affected upon the inverted roof through high winds that remove a portion of the inverted roof system.

The term "roof deck" is used to describe a structure upon which the water impermeable layer of the inverted roofing system is applied, which may be comprised of, but is not limited to at least one cover, shell, ceiling, truss, beam, post, infrastructure, foundation, existing roof, other support means, and the like.

As used herein, the term "about" refers to a +/−10% variation from the nominal value. It is to be understood that such a variation is always included in a given value provided herein, whether or not it is specifically referred to.

Unless defined otherwise, all technical terms used herein have the same meaning as commonly understood by one of ordinary skill in the art to which this invention belongs.

System and Method Overview

The present invention provides an inverted roofing system that allows for user control of the pound per square foot (lbs/sq ft) roof load. It further provides a lighter than industry standard inverted roofing system, which does not require a sloped roof gradient. The system may use a BTL that is lightweight, and yet maintains properties that will prevent wind uplift. The inverted roof system is thermally efficient, inexpensive and quick to install, provides the appearance and some functional benefits of a traditional natural green roof BTL, while also being better able to withstand environmental conditions.

The present invention also provides a method of assembling the inverted roofing system.

It is contemplated that the inverted roofing system and method may be used on any building structure, including but not limited to industrial buildings, residential buildings, agricultural buildings, commercial buildings, educational buildings, government buildings, religious buildings, military buildings, transport buildings, infrastructure buildings, permanent structures, temporary structures, and the like.

As will readily be appreciated by the skilled person, all components discussed herein can be formed of any suitable material and by any suitable manufacturing process.

System

In one embodiment, the inverted roofing system is comprised of a water impermeable layer superimposed upon a roof deck, upon which an insulating layer is applied, upon which a diffusion layer is applied, upon which a BTL is applied.

In one embodiment, the roof deck comprises of at least one roof deck material, as would be readily be appreciated by the skilled person.

In another embodiment, it is contemplated that the roof deck may be manipulated for specific purposes depending on the building structure, or design requirements. For example, the roof deck may include a substrate base in order to impose gradient on the roof. In another example, the roof deck may include a primer applied to a substrate in order to further alter the characteristics of the roof deck. It is contemplated that roof deck manipulations and inclusions may be numerous, as would be understood by someone skilled in the art.

In one embodiment, the water impermeable layer comprises at least one water impermeable material, as would be readily be appreciated by the skilled person. Said water impermeable material may be but is not limited to rubberized asphalt, impermeable sheeting, liquid sealant, spray sealant, solid sealant, solid membrane, single ply membrane, reinforced membrane and the like. Such water impermeable material may be applied using methods as are known in the art, such as but not limited to hot or cold applied, spray applied, interlocking applied, roll applied, pour applied, and the like. It is also contemplated that said materials and application methods may be used in combination.

In one embodiment, the water impermeable layer as applied to the inverted roofing system may be hot applied rubberized asphalt such as, but not limited to SPI6940.

In one embodiment, the insulating layer comprises at least one insulating material, as would be readily be appreciated by the skilled person. Said insulating layer may be, but is not limited to insulating material such as solid insulation, foam insulation, and the like. Such insulating material may be applied using methods as are known in the art, such as but not limited to laid application, interlocking application, rolled application, pour application, and the like. It is also contemplated that said materials and application methods may be used in combination.

In one embodiment, the insulating layer as applied to the inverted roofing system may be laid insulating material, such as but not limited to Dow Roofmate™.

In another embodiment, the diffusion layer may be comprised of at least one diffusion material, as would be readily be appreciated by the skilled person. Said diffusion layer may be, but is not limited to diffusion material such as board, sheeting, coarse ground, and the like. Such diffusion material may be applied using methods as are known in the art, such as but not limited to laid application, interlocking application, rolled application, pour application, and the like. It is also contemplated that said materials and application methods may be used in combination.

In one embodiment, the diffusion layer as applied to the inverted roofing system may be laid dimple board such as, but not limited to Nilex WD 15™.

In one embodiment, it is contemplated that at least one secondary layer may be added to the inverted roofing system to alter the properties of the system. For example, it is contemplated that a separation layer may be applied to the water impermeable layer, prior to the application of an insulation layer. This separation layer may act to prevent direct contact between the water impermeable layer and the insulation layer. This may prevent interaction between the two layers that otherwise could result in the layers attaching to one another, which could eventually lead to the destruction of at least one of the layers. Such destruction could come from, but is not limited to expansion/contraction cycles due to environmental conditions, different expansion/contraction properties of the materials, and the like. It is contemplated that the addition of at least one secondary layer may be for numerous purposes, as would be understood by someone skilled in the art.

In another embodiment, it is contemplated that at least one of the layers of the inverted roofing system may be removed to alter the properties of the system. For example, the diffusion layer may be removed in order to facilitate a BTL that can achieve a similar function, such as a gravel BTL. It is contemplated that the removal of at least one inverted roofing system layer may be for numerous purposes, as would be understood by someone skilled in the art.

In another embodiment, the BTL may be comprised of at least one BTL material, as would readily be appreciated by the skilled person. Said BTL may be, but is not limited to infill, artificial turf, tiles, sheeting, boards, green, and the like. It is also contemplated that said materials may be used in combination to create a BTL of multiple BTL materials. In this way, a BTL of new properties and function may be formed by combining more than one BTL materials. In one embodiment, it is contemplated that the BTL of combined BTL materials may be comprised of an artificial turf and an infill.

In one embodiment, an artificial turf may be comprised of a base, from which turf strands protrude upwards and away from the base, leaving space between the base and top of the turf strand. Such an artificial turf may be, but is not limited to Hydro Turf™, Astroturf, artificial grass, and the like.

In one embodiment, an infill may be comprised of granular material, liquid, foam, and the like that is capable of filling in the space within the artificial turf as described above. Such infill may be, but is not limited to cement, sand, coarse sand, polymeric sand, and the like.

It is contemplated that in one embodiment, the inverted roofing system provides a BTL that has improved properties for overcoming wind uplift. An artificial turf forms a natural air buffer, protecting the lower part of the artificial turf from the wind. An infill is able to occupy the space in the lower part of an artificial turf, once the turf has been agitated such that the turf strands protrude through the infill. This agitation allows the infill to settle within the artificial turf. Once the infill is settled, it will not be exposed to environmental factors, such as but not limited to wind—the infill is protected by the natural air buffer provided by the artificial turf. An infill otherwise exposed to environmental factors, such as but not limited to wind, may easily be removed from the roof. The infill also increases the lbs/sq ft mass of the artificial turf, which improves the ability of the artificial turf to counteract wind uplift. The increase of lbs/sq ft mass of the artificial turf created by the settled infill, which cannot be removed by environmental factors, such as but not limited to wind, in combination with the natural air buffing properties of the artificial turf, creates a BTL of combined BTL materials, of high wind uplift resistance. This BTL is capable of protecting the inverted roof system from wind uplift.

In one embodiment, BTL material may be applied using methods as are known in the art, such as but is not limited to spray application, laid application, interlocking application, rolled application, pour application, spreading, raking, and the like. It is also contemplated that said application methods may be used in combination.

It is contemplated that in one embodiment, the inverted roofing system may provide a BTL that is capable of variable lbs/sq ft roof loading. By combining an infill and artificial turf to create a BTL, such a BTL is capable of controlled roof loading. The amount of infill, the infill material used, and the manipulation of the infill within the artificial turf will each separately, or in combination, adjust the overall lbs/sq ft roof loading of the BTL.

In one embodiment, the BTL can be manipulated to provide roof loading of less than 10 lbs/sq ft, while maintaining properties that resist wind uplift similar to BTLs that provide heavier lbs/sq ft roof loading. Certain BTLs, such as a gravel BTL, may be used on an inverted roofing system. These BTLs must provide a roof load of at least 10 lbs/sq ft to prevent wind uplift. By providing lower lbs/sq ft roof loading and maintaining higher wind uplift resistance, the system provides an improved BTL that is able to provide the same wind lift resistance of other BTLs, while maintain lower roof loading.

In one embodiment, an improved BTL as described above may provide greater building design and construction capabilities. By retaining lower BTL lbs/sq ft roof loading, structural design may require less roof support means for a roof. Reducing the roof support means requirements may provide for greater options and freedoms in the methods and materials available for building structural design and construction.

In another embodiment, an improved BTL as described above may provide for cheaper inverted roof installation. By retaining lower BTL lbs/sq ft roof loading, there is a greater variety of materials available for inverted roof manufacture, of which many are cheaper. The amount of material required for manufacture of inverted roof manufacture may be less, which further reduces the cost of roof installation.

In another embodiment, an improved BTL as described above may provide for quicker inverted roof installation. The specific method used to install the BTL will be discussed below. The BTL as provided may reduce design and construction complexity that would otherwise be required for an inverted roof that includes a typical BTL. This may allow for quicker inverted roof manufacture. Quicker inverted roof construction will provide further benefits related to construction time and costs. By completing a quicker manufacture of roof structure, the entire building may be made weather proof more quickly. This will allow for overall quicker building manufacture, along with a reduction in construction delays due to environmental or seasonal conditions.

In one embodiment, the BTL may act as a wearing course. The artificial turf in combination with infill BTL as described above may prevent wear to the underlying elements from activity, such as but not limited to walking on the roof. The layers may be protected from such activity, which increases the lifetime of the inverted roofing system.

In one embodiment, the inverted roofing system may accommodate both a flat surface roof (slope gradient of less than at least 2%), and/or a roof with some slope gradient. Some inverted roofing systems, such as those that utilize a concrete topped insulation, as a preferred configuration use at least a 2% gradient on the roof. Without a 2% gradient on the roof, water may not drain properly. When water evaporates into vapor, it may be forced back upwards through the insulation layer. Should the vapor encounters a loose laid vapor barrier, such as concrete topped insulation, it may become trapped against the top of the insulation layer. Environmental factors may cause the trapped vapor to drive into the insulation layer, altering the insulating layer properties such as but not limited to reducing its R value and increasing its weight, and subsequently roof load, which over time may lead to the failure of the inverted roofing system. The diffusion layer as contemplated operates as an airspace to prevent any water vapor that may have formed, from driving into the insulation layer thus preventing the degradation of the inverted roofing system. Such a diffusion layer may be used for an inverted roofing system with a gradient of less than 2%.

In another embodiment, the inverted roofing system provides further improvements related to the use of the system on a roof of no slope gradient. Benefits related to construction and design costs, construction and design times, and construction and design options may be available when building design and construction utilizes a flat roof structure. Since the inverted roofing system as disclosed may be installed as a flat roof structure, the benefits outlined will be available when they otherwise may not.

In another embodiment, an inverted roofing system may be installed upon a flat roof deck at a roof load of less than 10 lbs/sq ft. Existing inverted roofing systems installed upon roof decks of less than 2% gradient require a gravel BTL. Gravel BTLs allow dissipation of water vapor that can form on roof decks of gradient less than 2% as described above. Such a gravel BTL requires a roof load of at least 10 lbs/sq ft. The inverted roofing system as provided achieves vapor dissipation through the diffusion layer while imposing a roof load of less than 10 lbs/sq ft.

In one embodiment, the insulating properties of the BTL as contemplated in the inverted roofing system may be improved. When an infill is combined with artificial turf to form a new BTL, the spaces within the artificial turf strands may be packed with the infill. The BTL materials used for the infill and artificial turf, as decided upon the inverted roof system manufacturer, will produce various insulating properties dependent upon those materials. It is also possible to physically manipulate the infill and/or artificial turf to further alter the insulating properties of the system. In one example, the artificial turf may be agitated to improve or reduce the insulating properties of the BTL layer. In another example, the infill may be wetted to change the properties of the infill material within the artificial turf. In another example, the infill and artificial turf may be colored black to further retain heat, or alternatively colored white to further reflect heat. In this way the insulating properties of the BTL as contemplated in the inverted roofing system may be controlled and improved.

In one embodiment, the artificial turf in combination with an infill BTL as contemplated may provide a convection loop allowing substantially easier cooling in the summer. The BTL and diffusion layer may operate together to allow heat to transfer off of the top of the insulation layer, and consequently the building structure much faster.

In one embodiment, the combination of artificial turf and infill to form a new BTL as described above provides the desirable inverted roof appearance as can be seen in traditional green roof systems. When the infill penetrates into the artificial turf stands, it may mimic the appearance of grass protruding through soil. Such an appearance can be further enhances by infill and artificial turf material selection, as well as by physical manipulation of the BTL.

In another embodiment, when the combination of artificial turf and infill form a new BTL to provide the green inverted roof appearance as described above, the utility of the inverted roof system may be improved. Traditional inverted roofing systems often do not appeal to persons as a desirable public space. The improved appearance and consequent association with green space as provided above may provide an inverted roof that is more desirable as public space. A building space that was otherwise unused may become used by the building occupants and the public alike for a variety of uses, such as but not limited to recreational activity, community activity, commercial activity, and the like.

In one embodiment, the combination of artificial turf and infill to form a new BTL as described above provides improved protection against environmental factors that degrade traditional inverted roofing systems. Environmental factors such as, but not limited to sunlight (UV rays), rain (moisture), snow (moisture), and the like, degrade components of the inverted roofing system. Environmental degradation reduces the lifetime of the inverted roofing system and results in loss of functionality of the roof. Replacement costs are expensive, time consuming, and may affect the building occupants. The BTL as provided may provide better protection against environmental degradation factors, consequently improving the lifetime of the inverted roofing system, while reducing costs associated with roof replacement.

In another embodiment, the inverted roofing system as provided may incorporate secondary BTL components to achieve further function. In one example, a heating or cooling component such as but not limited to heating coils, may be imbedded within the BTL. Said heating coils may be able to melt off ice, snow, sleet, and the like, that would otherwise accumulate on the inverted roofing system. In another example, a lighting component such as but not limited to electric lights, may be imbedding within the BTL. Said electric lights may be used to further increase the public utility of the inverted roof space by allowing for public access during dark hours of the day.

One embodiment of the inverted roofing system is described in FIG. 1. In this embodiment, the system is comprised of roof deck 008, upon which sits water impermeable layer 005, upon which sits separation layer 012, upon which sits insulating layer 009, upon which sits diffusion layer 010, upon which sits BTL 011.

General Method

In one embodiment, a roof deck 008 is comprised of a layer 006, which covers at least one portion of the inverted roof, which is constructed upon at least one portion of a roof truss 007. A primer is applied to at least one portion of the roof deck 008, prior to a water impermeable layer 005. A water impermeable layer 005 of rubberized asphalt SPI6940, is applied hot to at least one portion of the roof deck 008, and covers at least one portion of the inverted roof. A separation layer 012 is then applied to at least one portion of the water impermeable layer 005. An insulation layer 009 formed of the insulating material Dow Roofmate™ 004, is then be applied to at least one portion of the water impermeable layer 005. A diffusion layer 010 formed of the insulating material Nilex WD 15™ 003 is applied to at least one portion of the insulation layer 009. Finally, a BTL 011 formed of artificial turf 001 and infill 002 is then applied to at least one portion of the diffusion layer 010.

Sand Method

It is contemplated that in one embodiment, the BTL may be a combination of BTL materials, such as but not limited to sand infill and artificial turf. This BTL is formed by first rolling out artificial turf upon at least a portion of diffusion layer of inverted dimple board. Such dimple board could have been previously applied to at least a portion of an insulation layer. The artificial turf may then be flattened out over at least a portion of the roof and mechanically fastened as required. An infill of sand may then be placed in piles at consistent intervals overtop at least a portion of the artificial turf. The sand infill may then be raked out from the piles, to evenly cover at least a portion of the artificial turf. The artificial turf may then be brought to the surface of the BTL, by agitating the surface with an adapted power broom. This process will settle the sand infill within the artificial turf and may allow the turf strands to protrude through at least a portion of the sand.

Concrete Method

In another embodiment, the sand infill as described above may be substituted with a cementious infill to form a BTL. The same process of flattening and rolling out artificial turf over at least one portion of the diffusion layer, comprised of the dimple board, may be completed. An infill of cement may then be placed in piles at consistent intervals overtop at least a portion of the artificial turf. The infill of cement may then be raked out from the piles, to evenly cover at least a portion of the artificial turf. The artificial turf is then brought to the surface of the BTL, by agitating the surface with a power broom. This process will settle the cement infill within the artificial turf and may allow the turf strands to protrude through at least a portion of the cement infill. Once the artificial turf is satisfactorily brought to the surface of at least a portion of the cement infill, at least a portion of the BTL may be wetted with water. The at least a portion of the BTL is then allowed to dry, which causes at least a portion of the cement infill to harden within the artificial turf.

In one embodiment of the invention, the BTL infill may be comprised of a combination of cement and sand, or another combination of infill as understood by the skilled person. The infill combination may be applied over at least a portion of the artificial turf in different amounts, or the same amount. The different types of infill, or a combination infill, may be applied on the same portion, on different portions, on no portion, or some combination of portions thereof, of the artificial turf.

In another embodiment, the piles of infill as described above, may be placed at inconsistent intervals overtop at least one portion of the artificial turf.

In one embodiment, the piles of infill as described above, may be raked out unevenly from the piles overtop at least one portion of the artificial turf. The uneven raking of the infill may be for the purposes of accommodation of other roof elements, such as but not limited to water drains.

It is obvious that the foregoing embodiments of the invention are examples, and they can be varied in many ways. Such present or future variations are not to be regarded as a departure from the spirit and scope of the invention, and all such modifications as would be obvious to one skilled in the art are intended to be included within the scope of the following claims. It will be understood that the preceding was intended to describe embodiments of the invention and is not intended to limit the invention in any way.

The scope of the claims should not be limited by the preferred embodiments set forth in the examples, but should be given the broadest interpretation consistent with the description as a whole.

We claim:

1. A method of assembling an inverted roofing system to a roof deck comprising:
   applying at least one water impermeable layer to said roof deck;
   applying at least one insulation layer to the at least one water impermeable layer;
   applying at least one diffusion layer to the at least one insulation layer; and
   applying at least one ballast top-layer to the at least one diffusion layer,
      wherein the at least one ballast top-layer is assembled by applying at least one artificial turf layer to the at least one diffusion layer, and applying at least one infill to the at least one artificial turf layer,
      wherein the at least one artificial turf layer is applied such that an air buffer is formed between at least a portion of the at least one infill and a portion of the artificial turf layer opposite that of the at least one infill such that at least the at least one infill is protected by the air buffer.

2. The inverted roofing method according to claim 1, wherein the at least one artificial turf layer is applied to the at least one diffusion layer by rolling the at least one artificial turf layer onto the at least one diffusion layer, and flattening out the at least one artificial turf layer.

3. The inverted roofing method according to claim 1, wherein the at least one infill is applied to the at least one artificial turf layer by:
   placing the at least one infill on the at least one artificial turf layer;
   spreading/raking the at least one infill over the at least one artificial turf layer;
   agitating the at least one artificial turf layer to force the at least one infill into the at least one artificial turf layer; and
   wetting the at least one infill within the at least one artificial turf layer and allowing the at least one infill to harden.

4. The inverted roofing method according to claim 1, wherein the at least one infill is applied to the at least one artificial turf layer by:
   placing the at least one infill, on the at least one artificial turf layer;
   raking the at least one infill over the at least one artificial turf layer; and
   agitating the at least one artificial turf layer to force the at least one infill into the at least one artificial turf layer.

5. The inverted roofing method according to claim 1, wherein at least one primer is applied to the roof deck prior to applying at least one water impermeable layer.

6. The inverted roofing method according to claim 1, wherein at least one separation layer is applied to the at least one water impermeable layer prior to applying at least one insulation layer.

* * * * *